United States Patent [19]
Wada et al.

[11] Patent Number: 5,206,475
[45] Date of Patent: Apr. 27, 1993

[54] HIGH CELLULOSE TYPE COATED ELECTRODE

[75] Inventors: Takashi Wada; Shozo Naruse; Takeshi Sugino, all of Fujisawa, Japan

[73] Assignee: Kabushiki Kaisha Kobe Seiko Sho, Kobe, Japan

[21] Appl. No.: 848,183

[22] Filed: Mar. 10, 1992

[51] Int. Cl.$^5$ .............................................. B23K 35/22
[52] U.S. Cl. ............................ 219/145.23; 219/146.1
[58] Field of Search .......... 219/145.23, 146.1, 146.24, 219/146.3, 146.52

[56] References Cited
U.S. PATENT DOCUMENTS 3,645,782  2/1972  Johnson ........................... 219/146.1
4,282,420  8/1981  Banks .............................. 219/146.24
4,465,921  8/1984  Sakai et al. ..................... 219/146.24
4,719,330  1/1988  Ferree ............................. 219/146.3

Primary Examiner—Clifford C. Shaw
Attorney, Agent, or Firm—Oblon, Spivak, McClelland, Maier & Neustadt

[57] ABSTRACT

A high cellulose type coated electrode made up of a steel core wire and a coating material formed thereon from a mixture of a flux containing a large amount of cellulose and a binder, characterized in that the coating material contains 0.1-7.0% MgO, 7-25% iron oxide (in terms of FeO), 8-19% $TiO_2$, 10-30% $SiO_2$, 5-27% Mn, and 0.05-0.5% B, with the $TiO_2$/B ratio being 60-200, and the weight ratio of the coating material to the electrode is 0.1-0.19.

11 Claims, 1 Drawing Sheet

HIGH CELLULOSE TYPE COATED ELECTRODE

BACKGROUND OF THE INVENTION

1. Field of the Invention

The present invention relates to a high cellulose type coated electrode to be used for the downward butt welding of fixed pipes.

2. Description of the Prior Art

A high cellulose type coated electrode is suitable for downward welding because of its great arc force and its slag formation in small quantities. In addition, it facilitates melt-through welding on account of its arc characteristics. These features permit an extremely high welding speed for root pass in the downward butt welding of fixed pipes. For this reason, it has long been accepted for the site welding of pipe line in Europe and America.

However, a high cellulose type coated electrode has a disadvantage that it cannot be used for the welding of pipe line in cold districts where low-temperature toughness is important. This disadvantage is due to the fact that a high cellulose type coated electrode contains very little shielding material such as carbonate and fluoride and hence gives rise to weld metal containing oxygen and carbon (originating from cellulose) in large quantities which lead to a low toughness. Therefore, welding in cold districts needed a low hydrogen type coated electrode which is by far inferior in performance to a high cellulose type coated electrode.

SUMMARY OF THE INVENTION

The present invention was completed to eliminate the foregoing disadvantage involved in the prior art technology. It is an object of the present invention to provide a new high cellulose type coated electrode which offers improved operational characteristics and gives rise to tough weld metal.

In search of a high cellulose type coated electrode having these features, the present inventors carried out a series of researches, which led to the finding that the object is achieved if the coating material contains a controlled amount of boron in adequate proportion to other components, especially $TiO_2$. The present invention is based on this finding.

The gist of the present invention resides in a high cellulose type coated electrode made up of a steel core wire and a coating material formed thereon from a mixture of a flux containing a large amount of cellulose and a binder, the coating material containing 0.1–7.0% MgO, 7–25% iron oxide (in terms of FeO), 8–19% $TiO_2$, 10–30% $SiO_2$, 5–27% Mn, and 0.05–0.5% B, wherein the $TiO_2/B$ ratio is 60–200, and the weight ratio of the coating material to the electrode is 0.1–0.19.

DETAILED DESCRIPTION OF THE INVENTION

Figure 1:
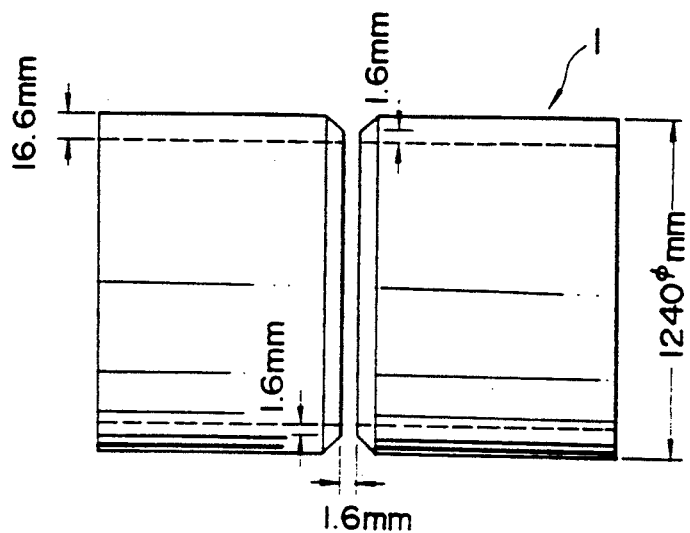
FIG. 1 is a schematic illustration showing the shape and dimensions of fixed pipes.

The invention will be described in more detail in the following. According to the present invention, the high cellulose type coated electrode has the coating material whose composition is specified as follows:

MgO:0.1–7.0%

This component improves the workability of electrodes, whatever the manipulation of electrode, without causing the dropping of molten metal and slag. It also reduces pits and joint defects detectable by X-ray test. With an amount less than 0.1%, it does not produce the desired effect. With an amount in excess of 7.0%, it results in a high slag fluidity which does not warrant downward welding. Thus the adequate content of MgO should be 0.1–7.0%, preferably 0.1–4.6%.

Iron oxide (in terms of FeO):7–25%

This component makes slag porous and readily removable and also prevents pits due to excessive deoxidation. With an amount less than 7%, it does not produce the desired effect. With an amount in excess of 25%, it results in a high slag fluidity which does not warrant downward welding. Thus the adequate content of iron oxide (in terms of FeO) should be 7–25%, preferably 10–18%. Incidentally, the iron oxide includes $Fe_2O_3$ as well as FeO. The amount of $Fe_2O_3$ should be calculated in terms of FeO.

$TiO_2$:8–19%

This component improves the arc stability. With an amount less than 8%, it does not produce the desired effect. With an amount in excess of 19%, it reduces the arc force, hindering downward welding. Thus the adequate amount of $TiO_2$ should be 8–19%, preferably 10–17%.

$SiO_2$:10–30%

This component is indispensable for adequate arc force, crater, and compatibility. With an amount less than 10%, it does not produce the desired effect. With an amount in excess of 30%, it increases slag and fluidity, making downward welding difficult. Thus the adequate amount of $SiO_2$ should be 10–30%, preferably 12–25%. Incidentally, $SiO_2$ may be added in the form of water glass or silicate minerals.

Mn:5–27%

This component serves as a deoxidizing agent and is indispensable for improved strength. With an amount less than 5%, it does not perform sufficient deoxidation necessary for clean weld metal. With an amount in excess of 27%, it brings about excessive deoxidation which gives rise to pits on the bead surface. Thus the amount of Mn should be 5–27%, preferably 7–18%. Incidentally, Mn may be added in the form of Fe-Mn or Mn oxide as well as metallic Mn. The amount of Fe-Mn or Mn oxide should be calculated in terms of metallic Mn.

B:0.05–0.5%

This component improves toughness, especially low-temperature toughness. With an amount less than 0.05%, it does not produce the desired effect. With an amount in excess of 0.5%, it deteriorates crack resistance. Thus the amount of B should be 0.05–0.5%, preferably 0.05–0.25%. Incidentally, B may be added in the form of oxide or alloy, in which case their amount should be calculated in terms of B. B in the form of Fe-Si-B is desirable from the standpoint of workability.

$TiO_2/B$: 60–200

Although B improves toughness as mentioned above, it lowers the arc force and makes the slag liable to dropping (which leads to poor workability). To prevent this drawback, it is necessary to control the amount of B such that the $TiO_2/B$ ratio is 60–200, preferably 80–200. This is effectively achieved when B is added in the form of Fe-Si-B.

The balance of the coating material is cellulose.

Furthermore, in order to improve the workability or mechanical strength, the coating material may be additionally incorporated with oxide components or metal components. In the above effective oxide components, 2.5% or less $K_2O$ stabilizes arcs, 3.0% or less $ZrO_2$ stabilizes arcs and slag covering, and prevents slag inclusion, and 2.0–6.0% $Na_2O$ strengthens arcs and increases the depth of penetration. Also, in the above effective metal components, 5.0% or less Ni improves impact resistance, 4.0% or less Mo increases tensile strength, 20% or less Fe controls slag amount and arc strength, and 6.5% or less Cr increases tensile strength.

EXAMPLES

Figure 2A:
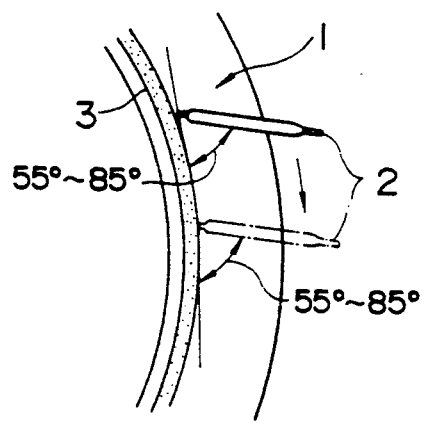
FIGS. 2(a) and 2(b) are schematic illustrations showing how the downward welding is performed on fixed pipes.
Figure 2B:
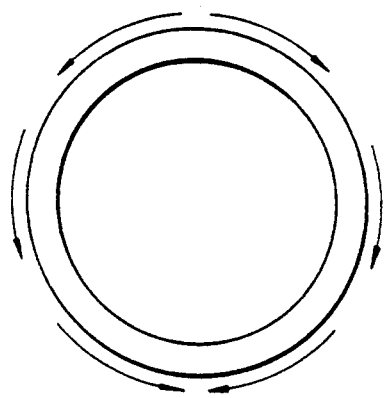

Coated electrodes were prepared each consisting of a steel core wire (4.0 mm in diameter and 350 mm long) and a coating material which differs in composition and coating ratio as shown in Table 1. They were tested for low-temperature toughness and workability by downward welding which was performed as shown in FIG. 2 on fixed pipes having the shapes and dimensions as shown in FIG. 1. The results are shown in Table 1.

The low-temperature toughness was rated according to the amount of energy absorbed in an impact test performed at −40° C. on a Charpy test piece cut out of the butt joint.

It is noted from Table 1 that high cellulose type coated electrodes pertaining to the present invention exhibit good workability and give rise to tough weld metal. By contrast, comparative samples neither good gives rise to tough weld metal nor does it exhibit good workability (except one case each) because of inadequate B contents.

As mentioned above, the present invention provides a high cellulose type coated electrode which gives rise to tough weld metal and exhibits good workability. It is suitable for downward welding in cold districts.

TABLE 1

| No. | Cellulose | FeO | TiO₂ | SiO₂ | Mn | MgO | B | TiO₂/B | Fe | Ni | Mo | Cr | K₂O | Na₂O | ZrO₂ | Others | Coating ratio | Low-temperature toughness | Workability | X-ray test | Remarks |
|---|---|---|---|---|---|---|---|---|---|---|---|---|---|---|---|---|---|---|---|---|---|
| 1 | 27.9 | 14.3 | 15.6 | 10.7 | 23.2 | 1.4 | 0.08 | 195.0 | — | — | — | — | — | 4.6 | — | 2.22 | 0.15 | ○ | ○ | ○ | Working Examples |
| 2 | 26.5 | 8.1 | 10.4 | 25.2 | 15.6 | 1.8 | 0.16 | 65.0 | 8.4 | — | — | — | — | 2.5 | — | 1.34 | 0.18 | ○ | ○ | ○ | |
| 3 | 27.1 | 7.8 | 14.1 | 19.4 | 14.6 | 4.8 | 0.18 | 78.3 | 6.3 | — | — | — | — | 3.5 | — | 2.22 | 0.14 | ○ | ○ | ○ | |
| 4 | 28.7 | 12.7 | 15.3 | 15.8 | 12.4 | 0.4 | 0.13 | 117.7 | 8.1 | — | — | — | — | 4.3 | 0.1 | 2.07 | 0.14 | ○ | ○ | ○ | |
| 5 | 25.3 | 17.7 | 18.4 | 16.3 | 5.6 | 2.2 | 0.19 | 96.8 | 8.4 | — | — | — | — | 4.1 | — | 1.81 | 0.16 | ○ | ○ | ○ | |
| 6 | 30.6 | 10.1 | 18.9 | 16.8 | 8.1 | 0.3 | 0.31 | 61.0 | 7.2 | — | — | — | — | 4.7 | — | 2.99 | 0.13 | ○ | ○ | ○ | |
| 7 | 23.1 | 8.9 | 18.7 | 21.1 | 15.1 | 5.5 | 0.11 | 170.0 | 1.7 | — | — | — | — | 3.6 | — | 2.19 | 0.12 | ○ | ○ | ○ | |
| 8 | 27.4 | 24.3 | 13.2 | 11.4 | 10.2 | 2.8 | 0.18 | 73.3 | 4.3 | — | — | — | — | 3.9 | — | 2.32 | 0.18 | ○ | ○ | ○ | |
| 9 | 26.2 | 10.6 | 15.9 | 15.6 | 13.8 | 6.6 | 0.12 | 132.5 | 3.6 | — | — | — | — | 5.1 | 2.48 | 0.16 | ○ | ○ | ○ | ○ | |
| 10 | 28.2 | 13.4 | 17.2 | 12.6 | 13.2 | 0.7 | 0.21 | 81.9 | 6.9 | — | — | — | — | 4.4 | — | 3.19 | 0.16 | ○ | ○ | ○ | |
| 11 | 26.4 | 14.5 | 13.9 | 18.5 | 12.3 | 0.8 | 0.07 | 198.6 | 6.1 | — | — | — | 0.8 | 4.1 | 1.3 | 1.23 | 0.15 | ○ | ○ | ○ | |
| 12 | 27.4 | 15.7 | 12.1 | 14.3 | 14.6 | 3.1 | 0.09 | 134.4 | 5.3 | — | — | — | — | 4.6 | — | 2.81 | 0.14 | ○ | ○ | ○ | |
| 13 | 27.7 | 11.6 | 15.7 | 15.1 | 9.6 | 1.2 | 0.14 | 112.1 | 10.6 | 3.5 | — | — | — | 3.6 | — | 1.76 | 0.17 | ○ | ○ | ○ | |
| 14 | 24.9 | 10.2 | 15.3 | 17.0 | 11.2 | 0.9 | 0.13 | 117.7 | 13.7 | — | 2.5 | — | — | 4.5 | — | 2.17 | 0.13 | ○ | ○ | ○ | |
| 15 | 27.4 | 11.6 | 14.5 | 15.4 | 13.2 | 1.3 | 0.10 | 145.0 | 7.6 | — | — | 5.5 | — | 4.3 | — | 2.10 | 0.16 | ○ | ○ | ○ | |
| 16 | 26.8 | 12.2 | 13.8 | 14.5 | 11.7 | 1.2 | 0.08 | 172.5 | 7.8 | — | — | — | — | 4.1 | — | 2.32 | 0.16 | ○ | ○ | ○ | |
| 17 | 28.9 | 14.3 | 13.7 | 10.9 | 21.5 | 1.3 | — | — | 3.0 | — | — | — | — | 3.8 | — | 2.60 | 0.14 | × | ○ | ○ | Comparative Example |
| 18 | 28.4 | 4.1 | 12.6 | 25.6 | 14.2 | 1.6 | 0.03 | 420.0 | 7.6 | — | — | — | — | 3.4 | — | 2.47 | 0.16 | × | × | × | |
| 20 | 30.9 | 16.7 | 3.9 | 26.4 | 11.3 | — | 0.02 | 195.0 | 4.6 | — | — | — | — | 3.9 | — | 2.28 | 0.18 | ○ | × | △ | |
| 21 | 27.3 | 27.2 | 11.1 | 14.1 | 3.2 | 8.9 | 0.13 | 85.4 | 1.6 | — | — | — | — | 3.8 | — | 2.67 | 0.14 | × | × | × | |
| 22 | 27.9 | 12.3 | 13.8 | 15.2 | 13.1 | 4.3 | 0.74 | 18.6 | 6.1 | — | — | — | — | 4.2 | — | 2.36 | 0.16 | × | △ | △ | |

Others include moisture and CO₂ gas.

What is claimed is:

1. A high cellulose type coated electrode made up of a steel core wire and a coating material formed thereon from a mixture of a flux containing a large amount of cellulose and a binder, said coating material containing:
 0.1 7.0% MgO;
 7–25% iron oxide (in terms of FeO);
 8–19% $TiO_2$;
 10–30% $SiO_2$;
 5–27% Mn; and
 0.05–0.5% B,
wherein the $TiO_2/B$ ratio is 60–200, and the weight ratio of said coating material to said coated electrode is 0.1–0.19.

2. A high cellulose type coated electrode as defined in claim 1, wherein the coating material contains B in the form of Fe-Si-B or Fe-B.

3. A high cellulose type coated electrode as defined in claim 1, wherein the coating material contains 0.1–4.6% MgO.

4. A high cellulose type coated electrode as defined in claim 1, wherein the coating material contains 10–18% iron oxide (in terms of FeO).

5. A high cellulose type coated electrode as defined in claim 1, wherein the coating material 10–17% $TiO_2$.

6. A high cellulose type coated electrode as defined in claim 1, wherein the coating material contains 12–25% $SiO_2$.

7. A high cellulose type coated electrode as defined in claim 1, wherein the coating material contains 7–18% Mn.

8. A high cellulose type coated electrode as defined in claim 1, wherein the coating material contains 0.05–0.25% B.

9. A high cellulose type coated electrode as defined in claim 1, wherein the coating material contains $TiO_2$ and B with the $TiO_2/B$ ratio being 80–200.

10. A high cellulose type coated electrode as defined in claim 1, wherein the coating material contains one or more additional oxide components selected from the group consisting of 2.5% or less $K_2O$, 3% or less $ZrO_2$, and 2.0–6.0% $Na_2O$.

11. A high cellulose type coated electrode as defined in claim 1, wherein the coating material contains one or more additional metal components selected from the group consisting of 5.0% or less Ni, 4.0% or less Mo, 20% or less Fe, and 6.5% or less Cr.

* * * * *